(12) United States Patent
Plante et al.

(10) Patent No.: US 9,592,625 B2
(45) Date of Patent: Mar. 14, 2017

(54) DEVICE FOR FABRICATING A COMPOSITE MATERIAL PART

(71) Applicant: SNECMA, Paris (FR)

(72) Inventors: Romain Plante, Fontainebleau (FR); Claude Canavese, Groissiat (FR); Denis Pingon, Hauteville Lompnes (FR); Jean-Francois Durand, Baraqueville (FR)

(73) Assignee: SNECMA, Paris (FR)

( * ) Notice: Subject to any disclaimer, the term of this patent is extended or adjusted under 35 U.S.C. 154(b) by 253 days.

(21) Appl. No.: 14/349,231

(22) PCT Filed: Oct. 1, 2012

(86) PCT No.: PCT/FR2012/052218
§ 371 (c)(1),
(2) Date: Apr. 2, 2014

(87) PCT Pub. No.: WO2013/050692
PCT Pub. Date: Apr. 11, 2013

(65) Prior Publication Data
US 2014/0239540 A1    Aug. 28, 2014

(30) Foreign Application Priority Data

Oct. 6, 2011    (FR) ...................................... 11 59012

(51) Int. Cl.
*B29C 33/48*    (2006.01)
*B29C 70/48*    (2006.01)
(Continued)

(52) U.S. Cl.
CPC .............. *B29C 33/48* (2013.01); *B29C 33/20* (2013.01); *B29C 33/42* (2013.01); *B29C 33/485* (2013.01);
(Continued)

(58) Field of Classification Search
CPC ...... B29C 33/48; B29C 33/485; B29C 53/824
See application file for complete search history.

(56) References Cited

U.S. PATENT DOCUMENTS

| | | | | |
|---|---|---|---|---|
| 1,394,558 A | * | 10/1921 | Klug | B29C 33/485 |
| | | | | 147/48 |
| 2,682,924 A | * | 7/1954 | Lomazzo | B26D 3/003 |
| | | | | 242/574.1 |

(Continued)

FOREIGN PATENT DOCUMENTS

DE    742 682    12/1943

OTHER PUBLICATIONS

International Search Report Issued Feb. 13, 2013 in PCT/FR12/052218 Filed Oct. 1, 2012.

*Primary Examiner* — Matthew Daniels
(74) *Attorney, Agent, or Firm* — Oblon, McClelland, Maier & Neustadt, L.L.P

(57) ABSTRACT

A device for fabricating a composite material part by injecting resin into a fiber structure. The device includes: a first die presenting two adjacent support surfaces defining a reentrant angle between them; at least one chock with a wedge-shaped portion configured to press the fiber structure into the angle; and a second die movable relative to the first die, the first and second dies being configured to clamp on the fiber structure and the chock. The chock is connected to the second die by at least one link, the link being hinged relative to the second die and relative to the chock to guide the wedge-shaped portion towards the angle to press the fiber structure into the angle when the second die approaches the first die.

8 Claims, 3 Drawing Sheets

(51) Int. Cl.
  B29C 70/34    (2006.01)
  B29C 70/46    (2006.01)
  B29C 33/20    (2006.01)
  B29C 33/42    (2006.01)
  B29C 45/00    (2006.01)
  B29L 31/00        (2006.01)
  B29K 63/00        (2006.01)
  B29K 79/00        (2006.01)
  B29K 307/04       (2006.01)
  B29K 309/02       (2006.01)
  B29K 309/08       (2006.01)
  B29L 9/00         (2006.01)
  B29L 31/30        (2006.01)

(52) U.S. Cl.
  CPC .......... B29C 45/0005 (2013.01); B29C 70/34 (2013.01); B29C 70/46 (2013.01); *B29C 70/462* (2013.01); *B29C 70/48* (2013.01); *B29K 2063/00* (2013.01); *B29K 2079/08* (2013.01); *B29K 2277/10* (2013.01); *B29K 2307/04* (2013.01); *B29K 2309/02* (2013.01); *B29K 2309/08* (2013.01); *B29L 2009/00* (2013.01); *B29L 2031/3076* (2013.01); *B29L 2031/7504* (2013.01)

(56) References Cited

U.S. PATENT DOCUMENTS

| | | |
|---|---|---|
| 3,376,184 A | 4/1968 | Ritchey et al. |
| 3,476,351 A * | 11/1969 | Burdett .............. B28B 7/30 249/181 |
| 5,597,435 A | 1/1997 | Desautels et al. |
| 2007/0182071 A1* | 8/2007 | Sekido ............... B29C 33/0066 264/511 |
| 2009/0098337 A1 | 4/2009 | Xie et al. |
| 2009/0277568 A1* | 11/2009 | Weimer ............... B29C 70/222 156/91 |

* cited by examiner

DEVICE FOR FABRICATING A COMPOSITE MATERIAL PART

FIELD OF THE INVENTION

The present description relates to a device for fabricating a composite material part.

Such a device may be used for fabricating a composite material part and in particular for fabricating an aeroengine fan casing.

STATE OF THE PRIOR ART

In an aeroengine, the fan casing generally performs several functions. It defines an air inlet passage into the engine, it supports an abradable material in register with the tips of the fan blades, it supports an optional structure for acoustic treatment at the inlet to the engine, and it incorporates or supports a retention shield. The shield constitutes a trap for retaining debris, such as ingested objects or fragments of damaged blades projected outwards by centrifuging, in order to prevent such debris from passing through the casing and reaching other portions of the airplane.

It is known to make fan casings out of composite material. By way of example, document EP 1 961 923 describes a method of fabricating a composite material casing of varying thickness. That method comprises a step of forming a fiber reinforcing structure, often referred to as a "preform", and a step of densifying the preform with a resin matrix. The fiber preform is made by superposing a plurality of layers of fiber strip. In that example, the fiber strip is made by three-dimensional weaving and it is wound on a mandrel, as a plurality of superposed layers, in order to form the preform. The mandrel used presents a central wall having an outside shape that corresponds to the inside shape of the main wall of the casing, and two cheekplates of shape corresponding to the shapes of the fastener flanges of the casing. The fiber preform as obtained in that way is held on the mandrel, and is then enclosed in a mold formed in part by the mandrel, and then impregnated with a resin that is injected into the mold.

During the impregnation step, it has been found that the layers of the fiber strip tend to become tensioned and to separate from the reentrant angles defined between the cheekplates and the central wall of the mandrel, thereby leading to compacting defects and to resin masses between the layers, and consequently to irregularity in the structure of the casing in these angles.

To mitigate that problem, it is known to put "compacting" chocks into place, which are configured to press the fiber preform into said angles while injection is taking place. Unfortunately, chocks are conventionally put into place manually: the chocks are put into position manually by touch, while blind, and they are subsequently fastened by being screwed to another portion of the mold. This step of putting the chocks into place is thus an operation that is slow and difficult and not compatible with mass production throughput rates, and it can also lead to chocks being poorly positioned.

There therefore exists a need for a novel type of device that makes it easier to put chocks into place.

SUMMARY OF THE INVENTION

The present description relates to a device for fabricating a composite material part, the composite part being fabricating by injecting resin into a fiber structure, the device comprising:

a first die configured to support the fiber structure, the first die presenting two adjacent support surfaces defining a reentrant angle between them;

at least one chock presenting first and second adjacent faces together defining a wedge-shaped portion configured to press the fiber structure into said angle; and a second die that is movable relative to the first die, the first and second dies being configured to clamp on the fiber structure and the chock in such a manner that the first die, the second die, and the chock together define, in a closed position, a resin injection space surrounding the fiber structure.

The closed position or "injection" pressure is thus the position in which the device is positioned while resin is being injected.

In the proposed device, the chock is connected to the second die by at least one link, the link being hinged relative to the second die and to the chock in such a manner as to guide the wedge-shaped portion towards said angle in order to press the fiber structure (or fiber preform) into the angle, when the second die approaches the first die.

By means of the link(s), the positioning of the chock in the reentrant angle defined between the two support surfaces of the first die, and thus the pressing of the fiber structure into this angle, takes place automatically as the dies approach each other. In comparison with the previously known manual positioning method, such automatic positioning of the chock is faster, more reliable (less risk of human error), and presents the advantage of being compatible with mass production rates of throughput.

In certain embodiments, a third face of the chock presses against the second die in said closed position, said third face being opposite from the first and second faces. In the closed position, such pressing guarantees that the chock is positioned in stable manner and that compression forces are properly transmitted.

In certain embodiments, a gasket is arranged between the third face and the second die around the link. This gasket serves to avoid resin passing between the chock and the second die, and in particular to avoid resin clogging up and thus jamming the link and disturbing the operation of the assembly.

In certain embodiments, the chock is connected to the second die by at least one pair of mutually parallel links. This makes it possible to guide the chock and to distribute the forces among the links, and thus to guarantee that the connection is reliable and long-lasting over production cycles.

In certain embodiments, the link is hinged to shells configured to be inserted in respective cavities formed in the chock and in the second die. The link and the shells thus form a module that is removable from the chock and from the second die. Where necessary, this module can be replaced easily. Fabrication of the chock and of the second die is also simplified. The shells may be secured to the chock and to the second die by any appropriate fastener means, for example, the shells may be engaged by force into said cavities and/or they may be held in position by bolts.

In certain embodiments, the first die is a mandrel around which the fiber structure is wound, the mandrel comprising a central wall and at least one cheekplate, the central wall and the cheekplate defining said adjacent support surfaces. Said chock thus serves to press the fiber structure between the central wall and the cheekplate while resin is being injected.

In certain embodiments, the device comprises a plurality of chocks, each chock being in the form of a ring segment, the chocks being arranged end to end so as to cover the entire circumference of the mandrel. Under such circumstances, the links may be connected in the vicinity of the ends of each ring segment, e.g. by self-jamming engagement.

The present description also provides a method of fabricating a composite material part, wherein the resin is injected into a fiber structure in order to from said composite material part, and wherein the proposed device is used to support the fiber structure and define a resin injection space surrounding the fiber structure.

In general, said composite material part may be any part presenting two adjacent outside surfaces that define a salient angle between them, the two outside surfaces corresponding to two adjacent support surfaces of the first die during fabrication, and the salient angle of the part corresponding to the reentrant angle of the die.

More particularly, said part may be an axisymmetric part possessing at least one flange substantially perpendicular to the axis of the part, said reentrant angle corresponding to the salient angle formed at the base of the flange.

In certain implementations, said part is an aeroengine fan casing, the casing having a main wall and at least one fastener flange, said reentrant angle corresponding to the salient angle formed between the main wall and the fastener flange.

By way of example, the casing is made from a fiber structure of carbon, glass, aramid, or ceramic fibers, and from a polymer resin, e.g. an epoxy, bismaleimide, or polyimide resin.

The above-mentioned characteristics and advantages, and others, appear on reading the following detailed description of an embodiment of the proposed device.

This detailed description makes reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are referenced by the same reference signs.

DETAILED DESCRIPTION OF EMBODIMENT(S)

An embodiment is described in detail below with reference to the accompanying drawings. This embodiment shows the characteristics and advantages of the invention. Nevertheless, it should be understood that the invention is not limited to this embodiment. In particular, although the invention is described below in the context of its application to fabricating an aeroengine fan casing, the invention is not limited to that application.

An implementation of a method of fabricating a fan casing is described in document EP 1 961 923, to which reference may be made.

Briefly, the fabrication method described in EP 1 961 923 consists in making a fiber strip or sheet by three-dimensional weaving with warp take-up on a drum, referred to below as the "take-up mandrel". The fiber sheet as made in this way is subsequently transferred onto the mandrel of a resin injection mold, referred to below as the "impregnation mandrel", with the outside shape of this mandrel matching the inside shape of the casing that is to be fabricated. Winding the fiber sheet around the impregnation mandrel makes it possible to obtain a fiber structure, also referred to as a "preform", that is made up of a plurality of superposed sheet layers.

The preform held wound on the impregnation mandrel is then impregnated with resin. After impregnation, a resin polymerization step is performed.

Figure 1:
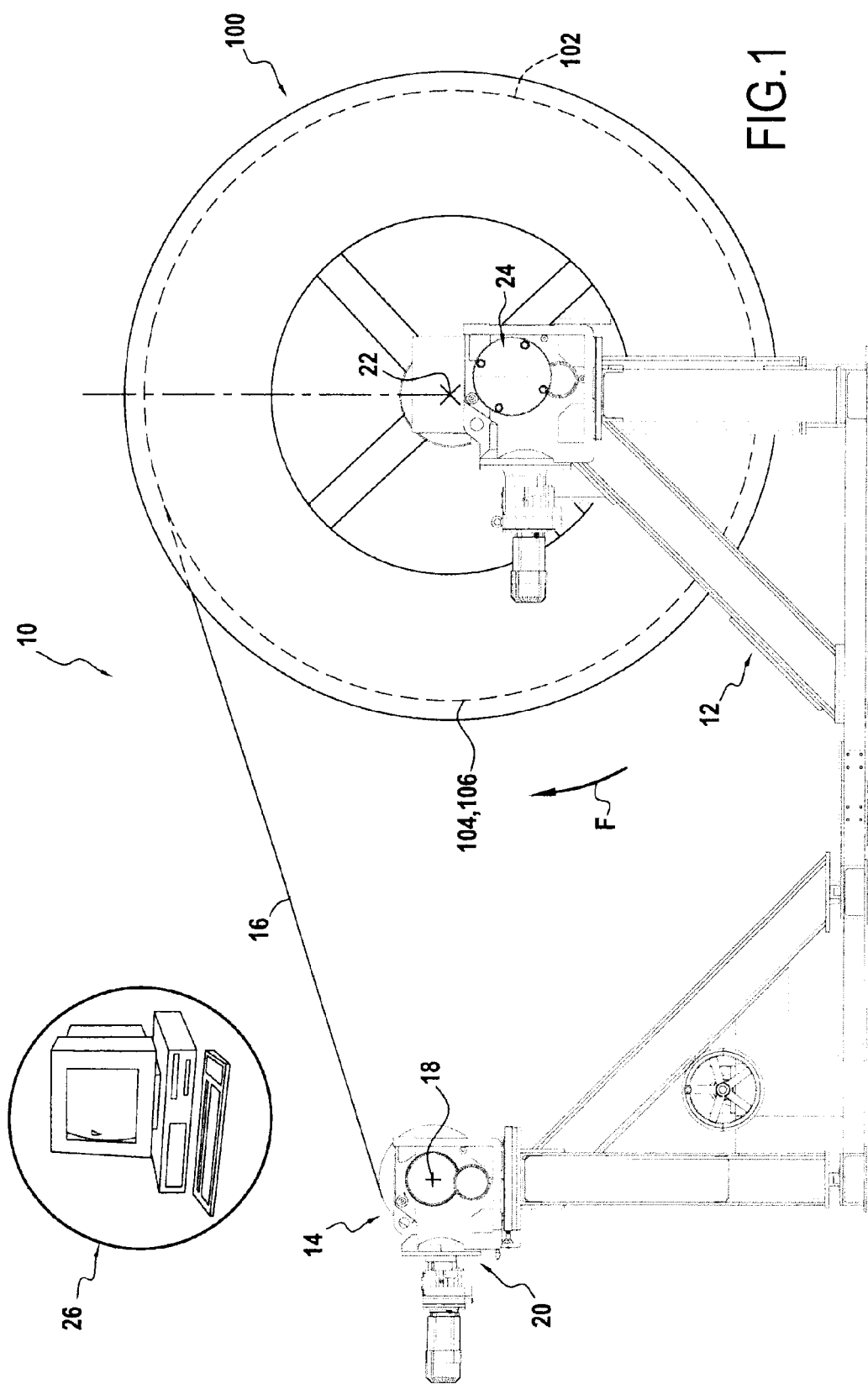
FIG. 1 is a side view of a machine for winding a fiber strip on a mandrel.

FIG. 1 shows an example of a winder machine 10 comprising a stand 12 supporting in particular a take-up mandrel 14 and an impregnation mandrel 100. These mandrels 14, 100 are removable, i.e. they can be taken away from the stand 12.

The take-up mandrel 14 carries the fiber sheet 16, as obtained by three-dimensional weaving. It is mounted to rotate relative to the stand 12, and it is driven in rotation about an axis 18 by an electric motor 20.

The impregnation mandrel 100 is to receive superposed layers of the fiber sheets 16 stored on the take-up mandrel 14. The impregnation mandrel 100 presents a central wall 102 forming a circular cylinder between two cheekplates 104, 106 (see FIGS. 1 and 2) extending in a direction that is generally perpendicular to the mandrel 100. The cheekplates 104 and 106 thus co-operate with the central wall 102 to define reentrant angles A. The outside shape of the mandrel 100 corresponds to the inside shape of the casing to be fabricated. More precisely, the outside surface of the central wall 102 corresponds to the inside surface of the main wall of the casing. Furthermore, the side surfaces facing towards the central wall 102 of the cheekplates 104, 106 correspond to the side surfaces of the fastener flanges of the casing, these flanges being provided at the axial ends of the casing in order to enable it to be mounted with and connected to other elements.

The impregnation mandrel 100 is rotatably mounted on the stand 12 to rotate about a horizontal axis 22 parallel to the axis of rotation 18 of the take-up mandrel 14, and it is driven in rotation by an electric motor 24. In the present description, the axial direction corresponds to the direction of the axis rotation 22 of the mandrel 100, and a radial direction is a direction perpendicular to said axis. Likewise, an axial plane is a plane containing the axis 22 and a radial plane is a plane perpendicular to the axis 22.

A control unit 26 is connected to the electric motors 20, 24 and it serves to control and monitor the speed of rotation of each of the mandrels 14 and 100. In general manner, the control unit 26 serves to govern all of the operating parameters of the winder machine 10.

The fiber sheet is wound in superposed layers on the impregnation mandrel 100 in the direction of rotation identified by arrow F in FIG. 1. By way of example, it is possible to wind the sheet 16 over about four turns of the mandrel 100 so as to obtain a fiber structure 28 made up of four superposed layers, presenting thickness that complies with the specifications for the casing to be fabricated.

The mandrel 100 constitutes a first die in the meaning of the present description.

After the winding step, the mandrel 100 is moved so as to be associated with other elements including a second die 130, as shown in FIGS. 2 to 6. More precisely, protection elements 29 may be arranged on the fiber structure 28 to protect the fiber structure and avoid it being pinched, and angular chocks 110, often referred to as "compacting" chocks, are positioned on the mandrel 100 over the portions of the fiber structure 28 covering the reentrant angles A formed between the central wall 102 and the cheekplates 104, 106 of the mandrel 100. It is important to observe in FIG. 2 that for reasons of clarity, the second die 130 is not shown. Nevertheless, as explained below, and as shown in FIGS. 3 to 6, each chock 110 is connected by links 150 to the second die 130. The links 150 are likewise not shown in FIG. 2 (they are shown in FIGS. 3 to 6).

Figure 2:
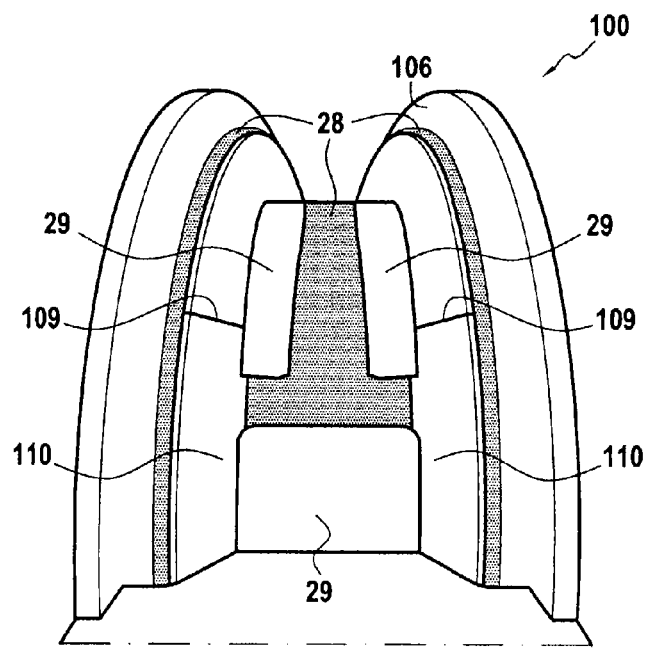
FIG. 2 is a simplified detail view in perspective of the FIG. 1 mandrel.
Figure 6:
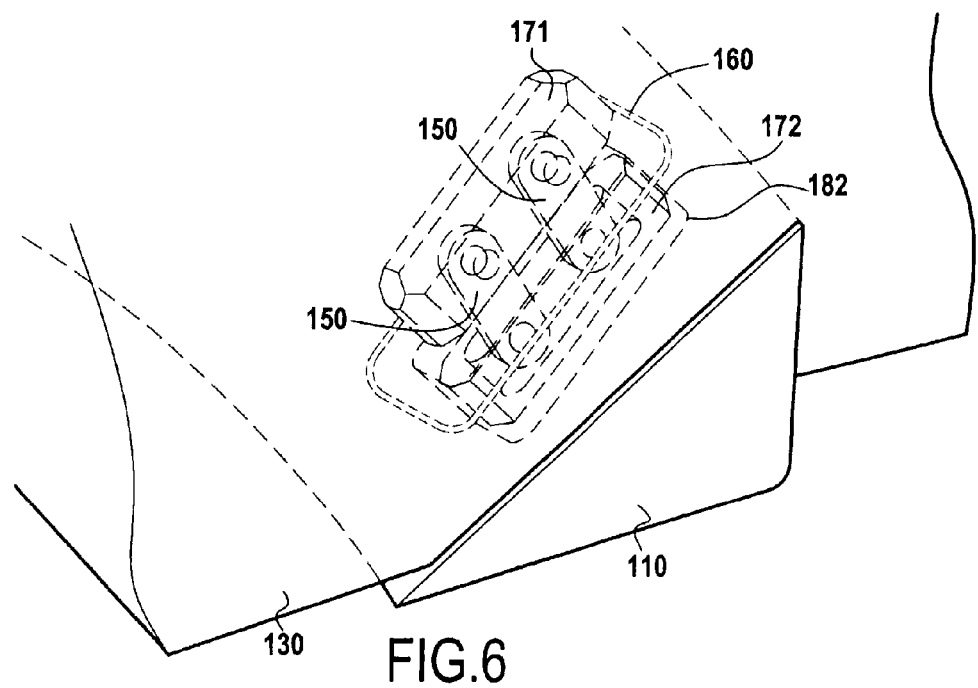
FIG. 6 is a detail view, in perspective, of the chock of FIGS. 3 to 5.
Figure 3:
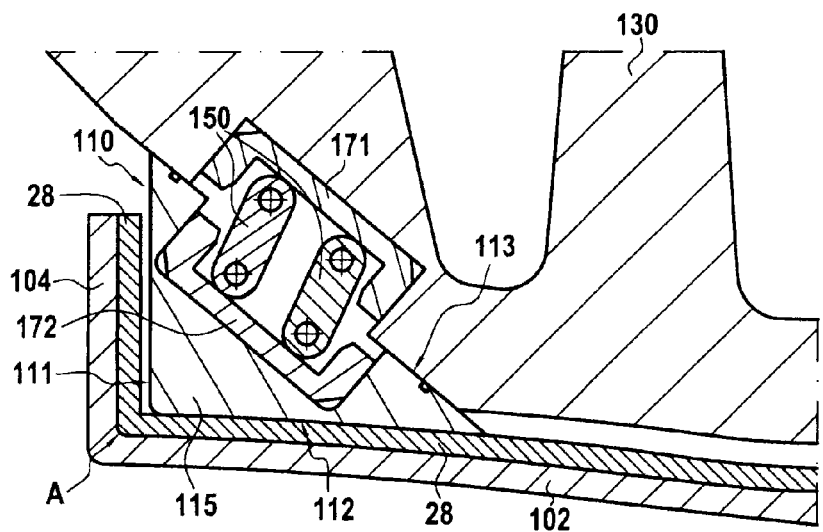
FIGS. 3 to 5 are detail views in axial section of an example of a compacting chock, showing the successive steps for automatically positioning the chock.
Figure 4:
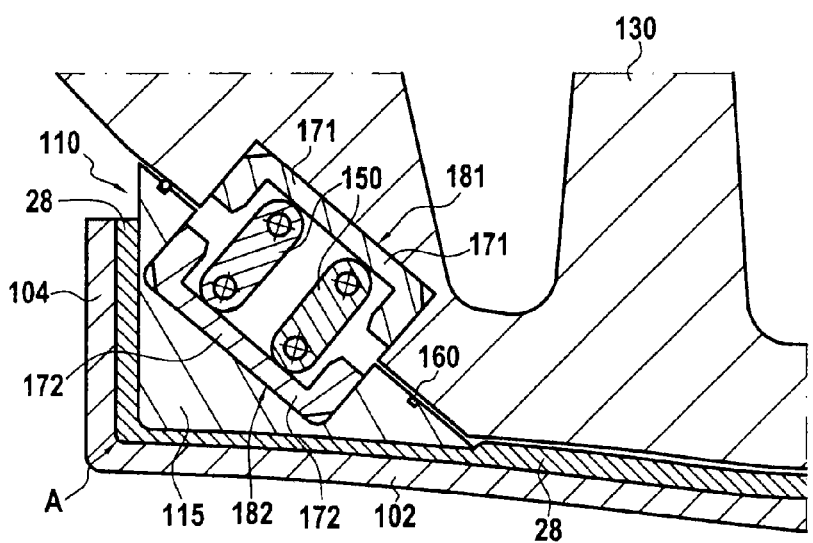
Figure 5:
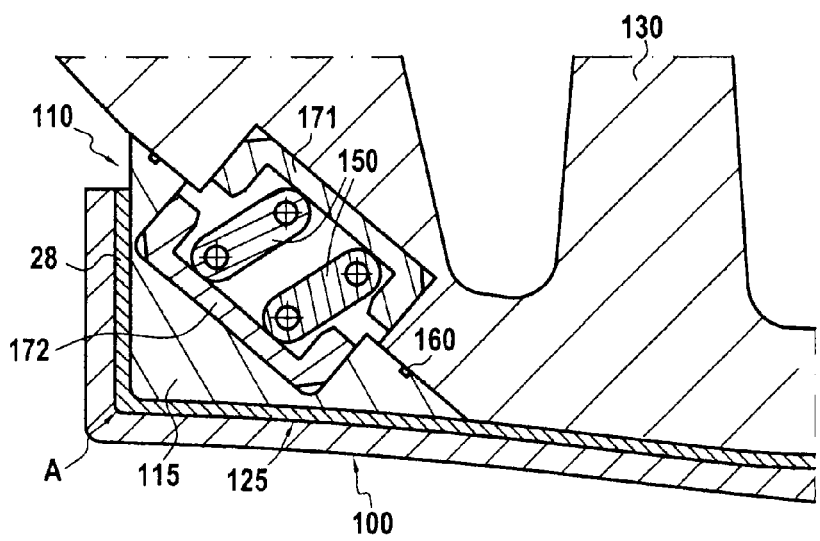

One of the chocks 110 is shown in detail and in axial section in FIGS. 3 to 5. Each chock 110 presents first and second adjacent faces 111 and 112 that together define a wedge-shaped portion 115 with a salient angle corresponding substantially to the reentrant angle A. This wedge-shaped portion 115 is configured to press the fiber structure 28 into the angle A. The chock 110 also presents a third face 113 opposite from the first and second faces 111, 112. The chock 110 presents an axial profile that is triangular (see FIGS. 3 to 5), the three sides of this profile corresponding to said faces 111-113. Each chock 110 is in the form of a ring segment extending circumferentially around the mandrel 100, such that the chocks 110, when arranged end to end, cover the total circumferential of the mandrel 100. In FIG. 2, reference 109 designates the interface between two adjacent chocks 110. In the example shown, each series of chocks 110 is made up of four chocks 110, each occupying an angle of about 90°. Naturally, the number of chocks 110 could be different.

The device also has a second die 130 that is movable relative to the mandrel 100 (the mandrel 100 constituting the first die). The second die 130, also referred to as a "backing shape", surrounds the mandrel 100 and the chock 110 circumferentially on the outside. Thus, the second die 130 and the mandrel 100 clamp on the fiber structure 28 and the chock 110.

Each chock 110 is connected to the second die 130 by pairs of links 150, the links in a given pair being parallel to each other, with the pivot axes of these links being mutually parallel. In the example shown, a pair of links 150 is provided at each of the circumferential ends of each chock 110. One or more link pairs may be added at equal distances from the link pairs situated at the two ends. Each link 150 is hinged relative to the second die 130 and to the chock 110 so as to guide the wedge-shaped portion 115 towards the angle A in order to press the fiber structure 28 into the angle A when the second die 130 comes closer to the mandrel 100.

The two links 150 in a given pair are hinged to shells 171, 172 respectively configured to be inserted in cavities 181, 182 formed in the chock 110 and in the second die 130. Thus, the two links 150 and the shells 171, 172 form a module that can be removed from the chock 110 and from the second die 130. In the example shown, the shells 171, 172 are engaged by force in the cavities 181, 182.

FIGS. 3 to 5 show successive steps in automatically positioning one of the chocks 110 as the second die 130 approaches the mandrel 100. In this example, the die 130 moves while the mandrel 100 is stationary. The die 130 moves radially towards the mandrel 100 (i.e. with reference to FIG. 3, the die 130 moves downwards). As the die 130 radially approaches the mandrel 100, the links 150 pivot so as to drive the chock 110 towards the cheekplate 104, the movement of the chock 110 having a component in a direction perpendicular to the approach direction of the die 130 towards the mandrel 100 (i.e. an axial direction in the example described, and specifically with reference to FIG. 3, the chock 110 moves to the left).

Thus, the chock 110 is guided by the links 150 towards the angle A, such that the chock 110 presses the fiber structure 28 into the angle A, as the second die 130 approaches the mandrel 100.

The die 130 is caused to approach the mandrel 100 until it reaches a "closed" position, as shown in FIG. 5, in which the mandrel 100, the second die 130, and the chock 110 together define an injection space 125 for injecting resin around the fiber structure 28. In the closed position, the first face 111 of the chock faces the cheekplate 104 and the fiber structure 28 is compressed between this first face 111 and the cheekplate 104; the second face 112 of the chock faces the central wall 102 of the mandrel 100 and the fiber structure 28 is compressed between this second face 112 and the wall 102; the third face 113 of the chock bears against the second die 130. The fiber structure 28 is thus compressed into the angle A by the chock 110 while resin is being injected into the injection space 125, thus preventing the fiber structure 28 from separating from the angle A.

As shown in FIGS. 3 to 6, a gasket 160 is arranged between the third face 113 and the second die 130, surrounding each pair of links 150. This gasket 160 serves to protect the links against any infiltration of resin between the third face 113 and the second die 130 while resin is being injected.

It should be observed that means (not shown) for injecting resin into the injection space 125 are also provided. For example, one of the cheekplates of the mandrel (e.g. the cheekplate 104) may have at least one resin injection orifice leading into the inside of the space 125. Thus, resin is injected at one of the ends of the fiber structure 28 held on the mandrel 100. Furthermore, a discharge orifice may be provided at the opposite cheekplate (e.g. the cheekplate 106).

The embodiments or implementations described in the present description are given by way of non-limiting illustration, and a person skilled in the art, in the light of this description, can easily modify these embodiments or implementations or may envisage others, while remaining within the scope of the invention.

Furthermore, the various characteristics of these embodiments or implementations may be used on their own or may be combined with one another. When they are combined, these characteristics may be combined as described above or other ways, the invention not being limited of the specific combinations described in the present description. In particular, unless specified to the contrary, any characteristic described with reference to one embodiment or implementation may be applied in analogous manner to any other embodiment or implementation.

The invention claimed is:

1. A device for fabricating a composite material part by injecting resin into a fiber structure, the device comprising:
   a first die configured to support the fiber structure, the first die presenting two adjacent support surfaces defining a reentrant angle between them;
   at least one chock presenting first and second adjacent faces together defining a wedge-shaped portion configured to press the fiber structure into the angle; and
   a second die that is movable relative to the first die, the first and second dies being configured to clamp on the fiber structure and the chock such that the first die, the second die, and the chock together define, in a closed position, a resin injection space surrounding the fiber structure;

wherein the chock is connected to the second die by at least one link, the link being hinged relative to the second die and to the chock to guide the wedge-shaped portion towards the angle to press the fiber structure into the angle, when the second die approaches the first die, and wherein the first die is a mandrel around which the fiber structure is wound, the mandrel comprising a central wall and at least one cheekplate, the central wall and the cheekplate defining said adjacent support surfaces.

2. A device according to claim 1, wherein a third face of the chock presses against the second die in the closed position, the third face being opposite from the first and second faces.

3. A device according to claim 2, further comprising a gasket arranged between the third face and the second die around the link.

4. A device according to claim 1, wherein the chock is connected to the second die by at least one pair of mutually parallel links.

5. A device according to claim 1, wherein the link is hinged to shells configured to be inserted in respective cavities formed in the chock and in the second die.

6. A device according to claim 1, having a plurality of chocks, wherein each chock is in a form of a ring segment, the chocks being arranged end to end to cover an entire circumference of the mandrel.

7. A method of fabricating a composite material part, comprising:

injecting, resin into a fiber structure using a device, the device including:

a first die configured to support the fiber structure, the first die presenting two adjacent support surfaces defining a reentrant angle between them;

at least one chock presenting first and second adjacent faces together defining a wedge-shaped portion configured to press the fiber structure into the angle; and a second die that is movable relative to the first die, the first and second dies being configured to clamp on the fiber structure and the chock such that the first die, the second die, and the chock together define, in a closed position, a resin injection space surrounding the fiber structure;

wherein the chock is connected to the second die by at least one link, the being hinged relative to the second die and to the chock to guide the wedge-shaped portion towards the angle to press the fiber structure into the angle, when the second die approaches the first die, and wherein the first die is a mandrel around which the fiber structure is wound, the mandrel comprising a central wall and at least one cheekplate, the central wall and the cheekplate defining said adjacent support surfaces.

8. A method of fabricating a composite material part according to claim 7, wherein the part is an aeroengine fan casing, the casing including a main wall and at least one fastener flange, the reentrant angle corresponding to a salient angle formed between the main wall and the fastener flange.

* * * * *